Nov. 17, 1959 — P. B. SHARPE — 2,913,256
TRAILER HITCH AND STEERING MEANS COMBINED
Filed Sept. 5, 1958 — 3 Sheets-Sheet 1
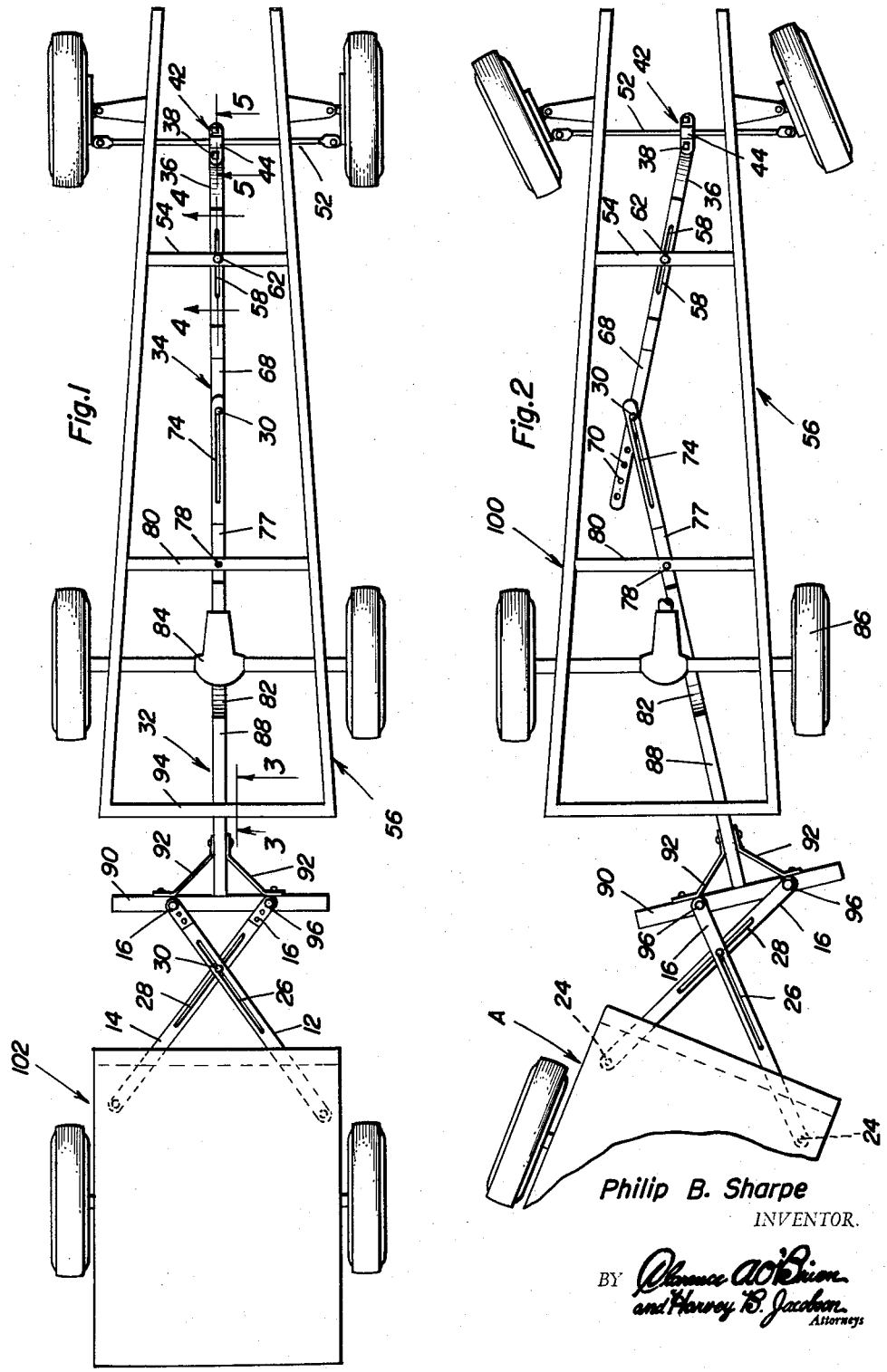
Philip B. Sharpe
INVENTOR.

Nov. 17, 1959     P. B. SHARPE     2,913,256
TRAILER HITCH AND STEERING MEANS COMBINED
Filed Sept. 5, 1958     3 Sheets-Sheet 2
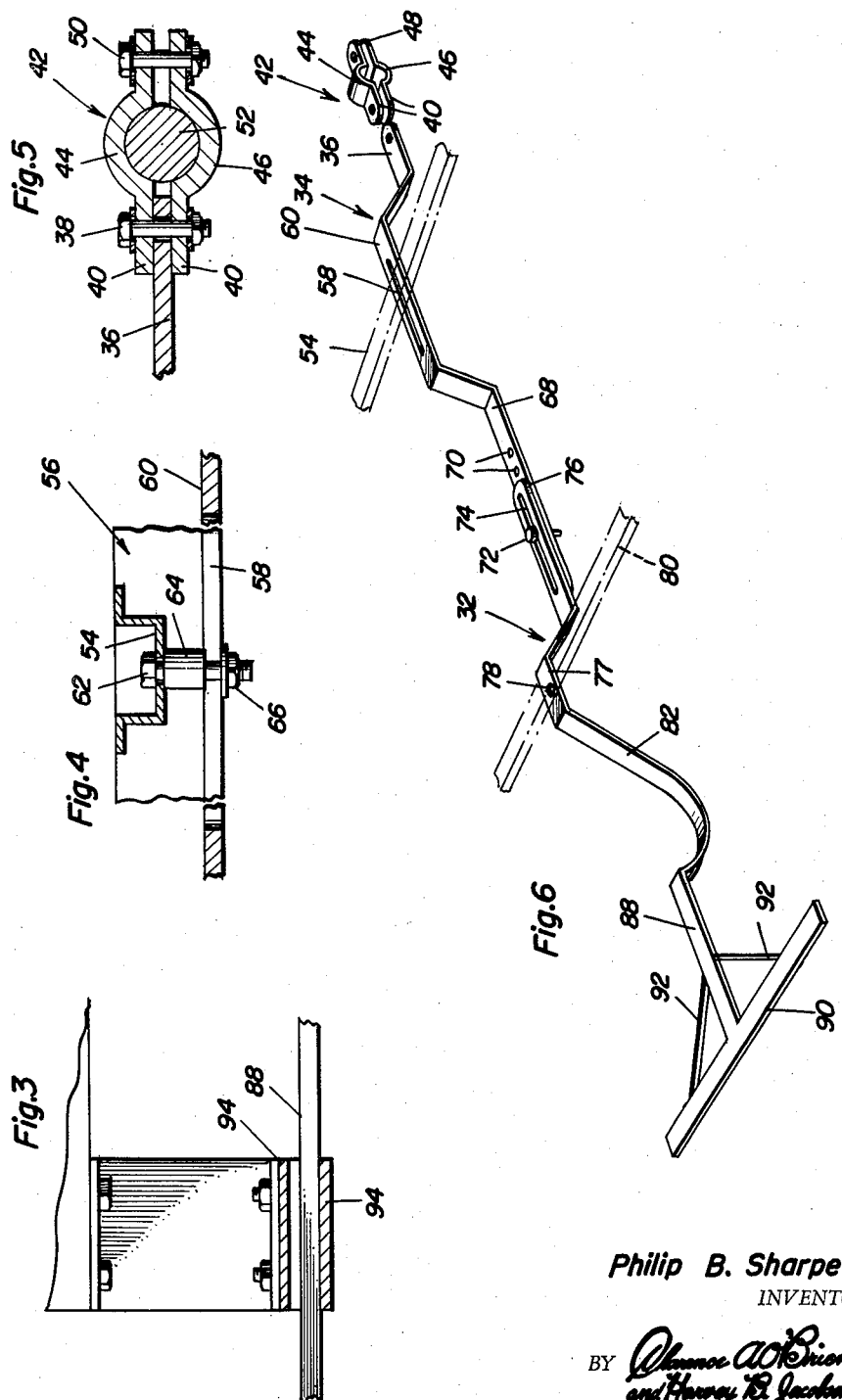
Philip B. Sharpe
INVENTOR.

Nov. 17, 1959 P. B. SHARPE 2,913,256
TRAILER HITCH AND STEERING MEANS COMBINED
Filed Sept. 5, 1958 3 Sheets-Sheet 3
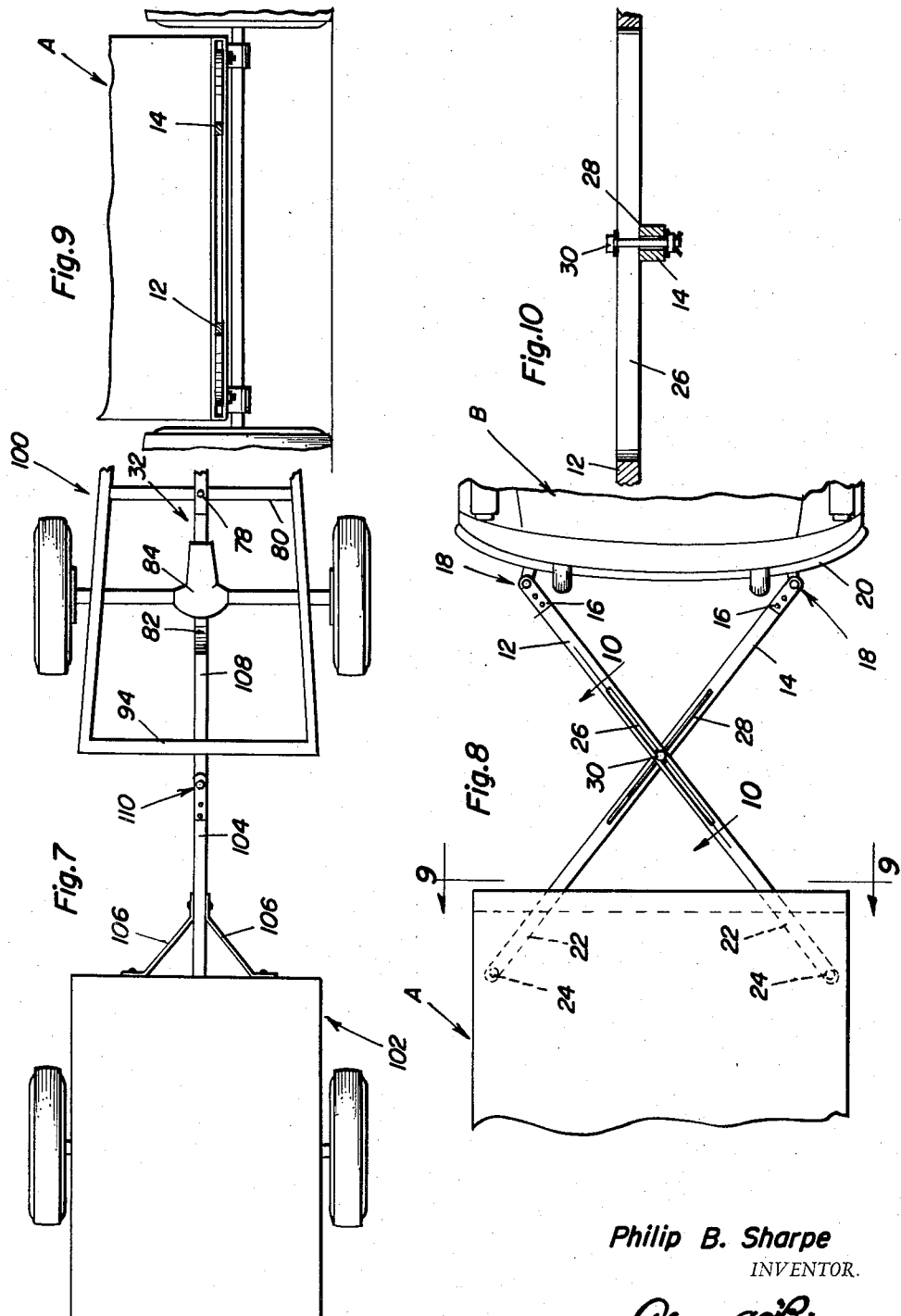
Philip B. Sharpe
INVENTOR.

United States Patent Office 2,913,256
Patented Nov. 17, 1959

2,913,256

TRAILER HITCH AND STEERING MEANS COMBINED

Philip B. Sharpe, Rockport, Maine

Application September 5, 1958, Serial No. 759,220

6 Claims. (Cl. 280—444)

The present invention relates to structurally novel mechanical means through the medium of which a user thereof may reliably connect two vehicles in spaced apart end-to-end relationship and which means is characterized on the one hand by a novel hitch, on the other hand by a simple and practical steering device and, in addition, by a combination of the hitching and steering devices.

Interpreted somewhat more specifically one vehicle might be classified as the rearward one which would have to be pulled or pushed; namely, a so-called trailer (boat dolly or trailer, house trailer, two-wheel moving trailer or the like). The forward or lead vehicle, more specifically, would constitute the powering and steering vehicle and may be a tractor, truck, automoblie or the like. To be sure, devices for coupling and hitching vehicles together usually have to do with draft tongues and so-called equalizing hitches and so on. It follows that the instant concept, speaking broadly, relates to improved hitch means and steering means, whether construed individually or singly, and also in a combination sense wherein each means contributes its intended purpose and proportionate function to the over-all construction.

With respect to the "hitch" this pertains to a simple, practical and economical twin-tongue hitch-forming construction with the tongues joined in X-shaped relationship. The purpose of this arrangement is to provide a hitch stronger than ones which have come to my attention. It may be properly stated here that where trailers are concerned the break is usually in the tongue. This happens because one wheel of a heavily loaded and fast moving trailer might strike a bump or, which is more likely, the far edge of a pot hole that would seriously impede the progress of that particular wheel. When this situation is met it causes a severe twitch, a circular sidewise sweeping motion of the front of the trailer which is normally held in line with the tongue. However such a severe stress subjects the ordinary tongue to severe strain and it breaks off for the most part near the body of the trailer.

Looking toward improving the objections referred to above the instant hitch comprises two tongues each running diagonally between the trailer and the lead or powering vehicle. The position of one of these links or tongues, being diagonal, will always be such as to receive the stress as a push which, roughly, is in the direction of its length and not transverse thereof. The position of the other link or tongue will always be such as to receive the stress as a pull which is roughly, along its length, and not transversely thereof. Hence, these tongues are amply strong to cope with stresses which are along their length and for the reason they are not severely strained by such imposed forces. Consequently, it means that the simple use of dual tongues in diagonal crossed relationship makes possible the use of tongues which are much lighter than the usual single tongue and yet are appreciably stronger in use, sufficiently so to assure one in saying that breakage of either tongue is quite unlikely.

The invention features the paired diagonal tongues which function to haul the load and at the same time to keep the load directly back of the hauling vehicle. The compensating adjustment for this featured construction would be the distance apart of the customarily used trailer hitch balls or equivalent attachments to the hauling vehicle in relation to the distance apart of the two pivots at the trailer end of the two diagonally disposed interconnected tongues and, of course, the total distance from the axle of the trailer to the points of attachment on the hauling vehicle.

The invention also pertains to practical and reliable steering means cooperating with the hitch in a manner that the over-all construction automatically steers the trailer wheels at the same time that the hitch and steering means pulls or pushes the trailer making the wheels of the hauling vehicle and the wheels of the hauled vehicle run in each other's track when going either forward or backward. Since automobile trailers in many fields of endeavor are gaining in popularity (particularly boat trailers) there exists a widespread need for the adoption and use of cooperating mechanical devices enabling drivers, both men and women, to handle and control the same and to move forward, backup, or park, as the case may be.

Other objects, features and advantages will become more readily apparent from the following description and the accompanying drawings.

In the drawings wherein like numerals are employed to designate like parts throughout the same:

Fig. 1 is a plan view showing a chassis at the right representing the lead or hauling vehicle and the two-wheeled or equivalent trailer at the left and showing both the steering and hitching devices cooperating conjointly.

Fig. 2 is a view based on Fig. 1 and showing how the components of the cooperating devices function in a steering maneuver.

Fig. 3 is an enlarged section on the plane of the line 3—3 of Fig. 1 looking in the direction of the arrows.

Figs. 4 and 5 are sections on the lines 4—4 and 5—5, respectively, of Fig. 1.

Fig. 6 is a perspective view of the steering control means or device by itself.

Fig. 7 is a plan view similar to Fig. 1 but showing the rear end portion of the steering means with a regular single tongue on the box-trailer substituted for the X-type hitch seen in Fig. 1.

Fig. 8 is a plan view emphasizing the construction and utilization of the X-type hitch by itself, and Figs. 9 and 10 are sections on the lines 9—9 and 10—10, respectively, of Fig. 8.

Inasmuch as the X-type trailer hitch is not only of significance by itself, but also in combination with a steering means, it is believed advisable to touch upon this first. Consequently reference may be made to Figs. 8, 9 and 10. In these figures as well as in the other figures the trailer is denoted at A and the lead or powering vehicle at B. Sometimes A is the vehicle to be hauled and B the hauling vehicle which all adds to the same thing so far as the spaced apart end-to-end "vehicles" are concerned. As before mentioned this hitch means is characterized by two substantially alike links or rigid linearly straight elongated tongues, the one tongue being denoted at 12 and the other one at 14. The forward end portions 16 are joined to ball and socket or equivalent hitching brackets 18 on the bumper or other part of the vehicle B as at 20. The opposite end portions 22 are disposed in divergent relationship and are pivotally joined or hinged at 24 in some appropriate manner to the bottom of the trailer A. The median portions of the tongues are disposed in contact or superimposed relationship as brought out in Fig. 10, the slot 26 in link 12 being alined cooperatively with the slot 28 in link 14 and the two slots serving to accommodate a connecting bolt and nut assembly as at 30. These tongues are attached to each other at this point to prevent their slapping together but they are free to slide by each other which within reasonable limits allows any motion except vertical slapping motion.

With respect now to the second aspect of the over-all combination and as has been mentioned before I have devised an arrangement which is characterized by two levers 32 and 34 (Fig. 6) the front or forward lever 34 having a terminal end portion 36 bolted as at 38 (Fig. 5) between end portions 40 of an adapter clamp 42 made up of the two clamp sections 44 and 46. The other end portions 48 of these clips are bolted together as at 50 and also as seen in Fig. 5 thus providing a push-pull operating connection between the clamp 42 and the tie rod 52. The numeral 54 designates a first crosspiece on the wheel supported chassis frame 56. The slotted portion 58 of the bent part 60 is bolted to the crosspiece in the manner shown in Fig. 4. The crosspiece may be a channel member and provided with a bolt 62 with a spacing sleeve 64 thereon with the shank of the bolt passing through the slot and equipped with an assembling and retaining nut 66. The rear end portion 68 is provided with a plurality of selectively usable bolt holes 70 for a bolt or equivalent pin 72 which extends through a selected one of the holes and through an elongated slot 74 in the forward end portion 76 of the lever 32. The offset portion 77 is again provided with a bolt hole 78 for connection with the cross member 80. The offset portion 82 which is slightly bowed is to accommodate the differential 84 on the wheel supported axle. The rear end portion 88 terminates in a crosshead 90 which is suitably braced as at 92. This end portion 88 actually extends through and beyond the spaced parallel end frame members 94 in the manner shown in Fig. 3. The forward diverging end portions of the tongues 12 and 14, that is the end portions 16, are hinged in spaced apart relationship at 96 to the crosshead 90.

As will be evident from Figs. 1 and 2 the interconnected steering levers and cooperating X-shaped hitch cooperate in a practical and reliable manner in that the construction serves to haul the trailer and at the same time steers the trailer forward or backward requiring no skill on the part of the driver except ordinary skill in driving and backing the hauling vehicle itself. The overall construction thus becomes an automatically steerable trailer hitch. Therefore and in the over-all combination aspect of the concept a structural adaptation is had which is characterized not only by simplicity, ease of installation and repair, but a practical accomplishment in satisfactorily serving the steering and hitching results for which the invention has been devised. Compared to a single tongue attached immovably at or near the middle of the rear bumper of a hauling vehicle (which would be the usual trailer hitch of present day use), this improved steerable trailer hitch is possessed of many times the strength, many times the ease of steering, and is characterized by component parts which make for ready adjustability. It can be realized too that the short trailers used so much by drivers in the amateur class are much more difficult to steer when backing than some of the big ten-wheeled commercial semi-trailers which are handled and backed up by professional trailer drivers. This is because of the much shorter distance between the trailer wheels and the point of attachment to the hauling vehicle which makes such combinations critical and difficult to steer.

In the modification seen in Fig. 7 the lead vehicle is conveniently denoted by the numeral 100 and the simple two-wheeled trailer by the numeral 102. This particular trailer is shown with a single rigid hauling tongue 104 having diagonal braces 106. The rear end portion 108 of the steering lever 32 already mentioned is in this arrangement without the aforementioned T-head 90. Instead a suitable ball joint element is provided and is joined with a bracket on the tongue thus providing a separable ball and socket joint connection as at 110 between the tongue 104 and the cooperating end portion 108 of the lever 32.

Reiterating it will be evident that novelty is predicated on the X-shaped hitch exemplified in the adaptation or arrangement seen in Fig. 8 in particular. Novelty is predicated on the simple twin-lever steering means of Fig. 6, also on the combination of the hitch of Fig. 8 with the steering means of Fig. 6 and the claims are being drafted accordingly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a first wheel supported vehicle employed as a power supply, transporting and steering vehicle for a second vehicle, a trailer for example, said first vehicle having steerable front wheels and a tie rod therebetween, an adapter coupling affixed to the central portion of said tie rod, a first lever pivotally and slidingly mounted on said first vehicle and having its forward end hingedly joined to the rear end portion of said coupling, a second lever pivotally mounted intermediate its ends on said first vehicle, adjacent ends of the respective levers being slidingly connected to each other, said first and second levers each being elongated, linearly straight and extending in the plane of said first vehicle when its front wheels are positioned for moving straight ahead, the pivotal mounting of said second lever on said first vehicle being located rearwardly of the slidingly connected ends of said levers, and means on the rearward end of said second lever whereby it may be operably connected with said second vehicle.

2. The structure defined in claim 1, and wherein said means comprises a right angularly disposed crosshead formed integrally with the trailing end of said second lever.

3. The structure defined in claim 1, and wherein said means embodies a ball jointing element which is adapted to be connected by way of a cooperating socket member to a tongue on a forward end of a trailer.

4. In combination, a lead vehicle embodying a wheel supported chassis having front steerable wheels and a tie rod operatively mounted between said wheels, said chassis also having a transverse cross member, a rigid first lever having pin and slot connection intermediate its ends with said cross member, a coupling carried by the median portion of said tie rod and pivotally connected to the adjacent forward end of said first lever, the rearward end of said lever being provided with selectively usable bolt holes, a second lever rearwardly of the first lever and pivotally mounted intermediate its ends on a cross member carried by a rearward portion of said chassis, the forward end of said second lever having an elongated slot carrying a bolt adjustably connected with said bolt holes, the rearward end of said second lever projecting rearwardly of the rear portion of the chassis and adapted to move in a horizontal plane and in an arcuate path, said levers extending in the plane of the longitudinal axis of said chassis when said front wheels are positioned for movement straight ahead.

5. In combination, a lead vehicle embodying a wheel supported chassis having front steerable wheels and a tie rod operatively mounted between said wheels, said chassis also having a transverse cross member, a rigid first lever having pin and slot connection intermediate its ends with said cross member, a coupling carried by the median portion of said tie rod and pivotally connected to the adjacent forward end of said first lever, the rearward end of said lever being provided with selectively usable bolt holes, a second lever rearwardly of the first lever and pivotally mounted intermediate its ends on a cross member carried by a rearward portion of said chassis, the forward end of said second lever having an elongated slot carrying a bolt adjustably connected with said bolt holes, the rearward end of said second lever projecting rearwardly of the rear portion of the chassis and adapted to move in a horizontal plane and in an arcuate path, said levers extending in the plane of the longitudinal axis of said chassis when said front wheels are positioned for movement straight ahead, a substantially X-shaped hitch comprising a pair of crossed adjustably connected rigid tongues, the rearward ends of said tongues being adapted to be hingedly joined to a trailer, the forward ends thereof being disposed in divergent relationship and being hingedly connected to an adjacent rear portion of the projecting rear end of said second lever.

6. In combination, a lead vehicle embodying a wheel supported chassis having front steerable wheels and a tie rod operatively mounted between said wheels, said chassis also having a transverse cross member, a rigid first lever having pin and slot connection intermediate its ends with said cross member, a coupling carried by the median portion of said tie rod and pivotally connected to the adjacent forward end of said first lever, the rearward end of said lever being provided with selectively usable bolt holes, a second lever rearwardly of the first lever and pivotally mounted intermediate its ends on a cross member carried by a rearward portion of said chassis, the forward end of said second lever having an elongated slot carrying a bolt adjustably connected with said bolt holes, the rearward end portion of said second lever projecting rearwardly of the rear portion of the chassis and being provided with a right angularly disposed cross-head which is adapted to move in a horizontal plane in an arcuate path to the left and right of the longitudinal axis of said lead vehicle chassis, and a substantially X-shaped hitch comprising a pair of crossed adjustably connected tongues, the rearward ends of said tongues being adapted to be hingedly joined to a trailer, the forward ends thereof being disposed in divergent relationship and being hingedly connected to longitudinally spaced portions of said crosshead.

References Cited in the file of this patent

UNITED STATES PATENTS

| 2,313,235 | Grove | Mar. 9, 1943 |
| 2,378,297 | Hetzler | June 12, 1945 |

FOREIGN PATENTS

| 144,132 | Great Britain | June 10, 1920 |
| 607,293 | Great Britain | Aug. 27, 1948 |